UNITED STATES PATENT OFFICE.

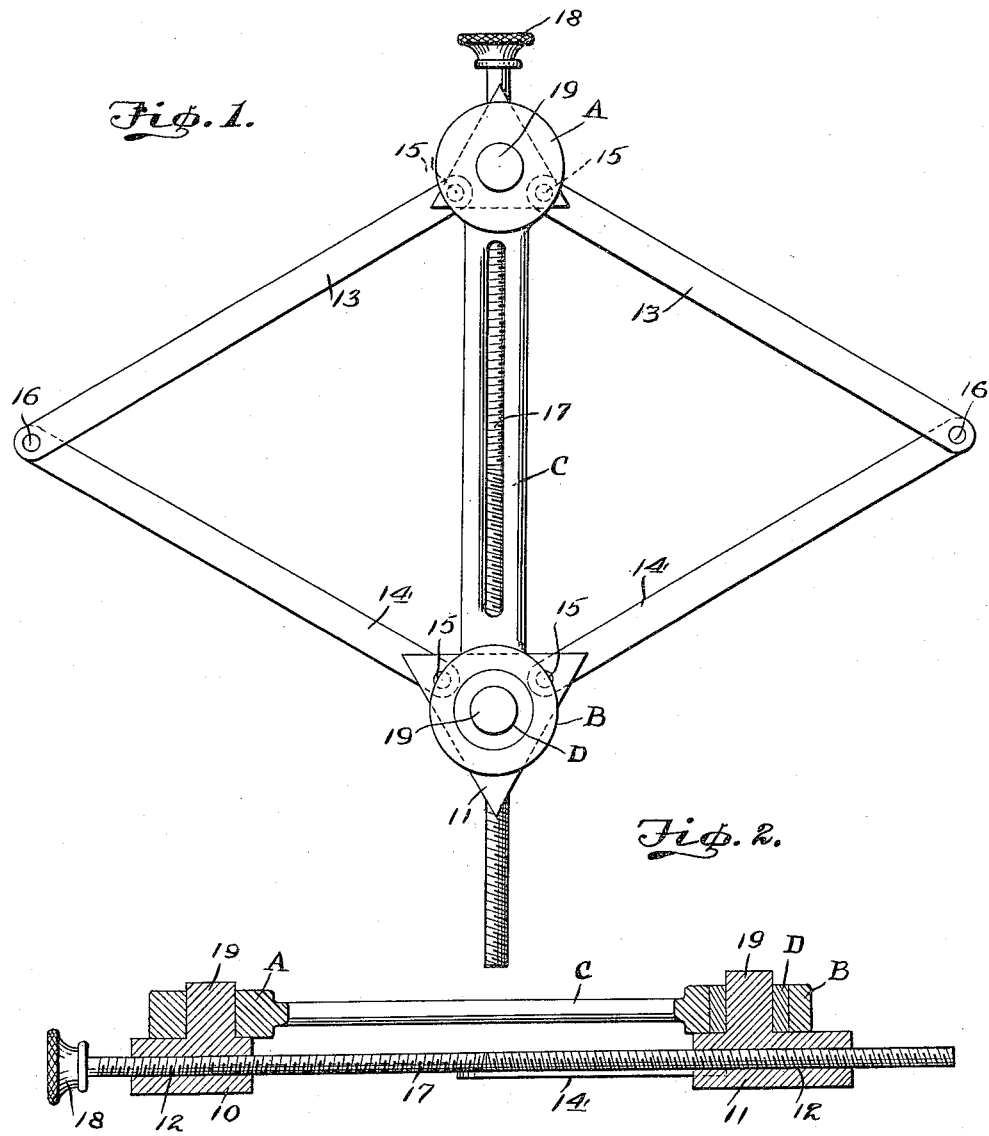

ARTHUR L. ECKMAN, OF BROOKINGS, SOUTH DAKOTA.

APPARATUS FOR BABBITTING CONNECTING-RODS.

1,165,079.  Specification of Letters Patent.  Patented Dec. 21, 1915.

Application filed June 8, 1915. Serial No. 32,962.

*To all whom it may concern:*

Be it known that I, ARTHUR L. ECKMAN, a citizen of the United States, residing at Brookings, in the county of Brookings and State of South Dakota, have invented certain new and useful Improvements in Apparatus for Babbitting Connecting-Rods, of which the following is a specification.

The present invention relates to an apparatus for applying Babbitt metal to engine connecting rods and the object thereof is to provide an improved device of this character which is readily adjustable to correspond with the length of the piece to be babbitted and to provide for the correct centering of the mandrel or core piece with respect to the worn eye.

Another object is to provide an apparatus of the type in question which is extremely simple in construction and which eliminates the use of all cumbersome supporting structure, to the end that the same may be easily and quickly folded so as to be entirely out of the way when not in use and providing for conveniently carrying or transporting in automobiles and the like.

Various other objects and advantages will become apparent during the continuance of the following description.

The above and other objects which will become apparent, are accomplished by such means as are shown in their preferred form in the accompanying drawings, described in the following specification and then more specifically pointed out in the appended claims.

In the accompanying drawings wherein like characters designate like parts throughout the several views; Figure 1 is a plan view of my invention showing the same in conjunction with an ordinary connecting rod. Fig. 2 is a transverse sectional view of the device as shown in Fig. 1.

In the drawings, the numerals 10 and 11 indicate suitable arbor blocks which, as shown in Fig. 1, are substantially triangularly shaped in plan, and are provided with a screw threaded bore 12 for the purpose that will presently appear. Certain of the corners of each of the arbor blocks are bifurcated (see Fig. 1) and have pivotal connection with a series of arms 13 and 14 respectively as at 15. The said arms are in turn pivotally connected together as at 16, forming a toggle-joint whereby the said arbor blocks may be uniformly moved relative to each other. It will also be recognized that the arms 13 and 14 serve to retain the arbor blocks against turning movement irrespective of one another, and to retain the said blocks in an advantageous position at all times so that a connecting rod, such as shown at C in the drawings can be readily engaged therewith.

Now, in order to provide for the uniform adjustment of the arbor blocks and the secure setting of the same at certain desired positions, an oppositely threaded screw rod 17 is employed which extends through the bores 12 of the arbor blocks as indicated in Fig. 2. The rod is also provided with a head portion 18 which is suitably milled to facilitate the manipulation. Consequently the rotation of the rod will cause the uniform adjustment of the arbor blocks thereon so that the same may be adjusted in accordance with the length of the piece to be babbitted. Further, each of the arbor blocks is provided with an upstanding core piece 19 for engagement with the respective eyes A and B of the connecting rod C. Upon reference to Fig. 2 it will be noted that the core piece on the arbor block 11 is slightly smaller in diameter than the core piece on the other arbor block consequently the worn eye B of the connecting rod is usually arranged about the smaller core piece in the manner shown. Hence by properly manipulating the rod 17 the arbor block 11 may be moved to effect the correct centering of the core piece thereon with respect to the worn eye thus allowing the Babbitt metal to be poured about said core to form a bearing D. By the provision of this form of core piece it will be noted that the worn eye of the connecting rod does not necessarily have to be subsequently bored or finished and that the bearing will be formed irrespective of the manner in which the eye is worn and will provide for the convenient insertion of the crank shaft.

From the foregoing it is believed that the advantages and novel features of my invention will be readily understood and that a further detailed description of the apparatus will be unnecessary.

In reducing my invention to practice I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

Having thus fully described my invention, what I claim as new and desire to secure by Letters Patent is:

1. In an apparatus for babbitting connecting rods, a pair of arbor blocks, each of said blocks provided with an upstanding core piece; means connecting said arbor blocks for positively adjusting the same; and other means connecting said arbor blocks and having pivotal connection therewith, for the purpose specified.

2. In a device of the character described, a pair of arbor blocks, an upstanding core piece on each of said arbor blocks, one of said core pieces being slightly larger in diameter than the other; means connecting said arbor blocks and retaining the same in a set position; and other means connecting said arbor blocks having pivotal connection therewith, for the purpose specified.

3. In a device of the character described, a pair of arbor blocks, an upstanding core piece formed on each of said blocks; a rod connecting said blocks for effecting the adjustment thereof; and other means connecting said blocks and having pivotal connection therewith, for the purpose specified.

4. In a device of the character described, a pair of arbor blocks, a core piece formed on each of said blocks; a screw threaded rod connecting said blocks, for effecting the adjustment thereof, and other means connecting said blocks and having pivotal connection therewith, for the purpose specified.

5. In a device of the character described, a pair of arbor blocks, a core piece formed on each of said blocks; a screw threaded rod connecting said blocks for effecting the adjustment thereof; arms pivotally connected to each of said arbor blocks, and means pivotally connecting the adjacent ends of said arms, for the purpose specified.

6. In a device of the character described, a pair of arbor blocks, a core piece formed on each of said blocks; a screw threaded rod connecting said blocks whereby the same may be adjusted; a pair of arms pivotally connected at one end to each of said arbor blocks, and means pivotally connecting said arms forming a toggle joint, for the purpose specified.

In testimony whereof I affix my signature in presence of two witnesses.

ARTHUR L. ECKMAN.

Witnesses:
L. A. OTTERNESS,
P. W. POLSON.

Copies of this patent may be obtained for five cents each, by addressing the "Commissioner of Patents, Washington, D. C."